United States Patent [19]
O'Brian

[11] Patent Number: 6,070,313
[45] Date of Patent: Jun. 6, 2000

[54] ROLLER STOP FOR TARPAULIN REPLACEMENT

[76] Inventor: Woody V. O'Brian, 3416 Queens Ferry Dr., Wilson, N.C. 27896

[21] Appl. No.: 09/037,804

[22] Filed: Mar. 10, 1998

[51] Int. Cl.[7] .................................................. B23P 19/04
[52] U.S. Cl. ............................. 29/240; 29/267; 29/270; 29/402.08; 81/451; 81/180.1; 296/100.14
[58] Field of Search .................... 29/240, 270, 402.01, 29/402.08, 426.6, 267; 81/180.1, 451, 120; 296/98, 100.14

[56] References Cited

U.S. PATENT DOCUMENTS

| | | |
|---|---|---|
| 1,099,079 | 6/1914 | Alden . |
| 1,280,272 | 10/1918 | Montroy . |
| 1,410,432 | 3/1922 | Wallin . |
| 2,687,567 | 8/1954 | Walraven . |
| 2,999,310 | 9/1961 | Pope . |
| 3,595,559 | 7/1971 | Gettinger . |
| 3,977,719 | 8/1976 | Thurston . |
| 4,532,834 | 8/1985 | Hartman . |
| 4,781,234 | 11/1988 | Okumura et al. . |
| 4,882,960 | 11/1989 | Kugler . |
| 4,934,037 | 6/1990 | Schuerg et al. . |
| 4,974,480 | 12/1990 | Kubik et al. . |
| 5,012,707 | 5/1991 | DiBiagio . |
| 5,107,552 | 4/1992 | Lavalliere et al. . |
| 5,129,698 | 7/1992 | Cohrs et al. . |
| 5,174,625 | 12/1992 | Gothier et al. . |
| 5,292,169 | 3/1994 | O'Brian . |
| 5,303,619 | 4/1994 | Cole, Sr. . |
| 5,388,882 | 2/1995 | Russell et al. . |
| 5,423,588 | 6/1995 | Eglinton . |
| 5,469,766 | 11/1995 | Hodges . |

FOREIGN PATENT DOCUMENTS

| | | |
|---|---|---|
| 427-677 | 5/1991 | European Pat. Off. . |
| 58-141920 | 8/1983 | Japan . |

*Primary Examiner*—David P. Bryant
*Attorney, Agent, or Firm*—Moore & Van Allen, PLLC; Scott W. Reid

[57] ABSTRACT

Disclosed is a locking wrench and tarpaulin replacement method for a truck with a tarpaulin assembly having a spring-biased tarpaulin roller rotatably mounted on a roller shaft and a tarpaulin attached to the roller. The locking wrench comprises a handle portion, a roller-shaft-engaging portion, and an outwardly-projecting stem for engaging a hole provided in the side of the roller when the roller-shaft-engaging portion engages the roller shaft. When the wrench is secured to the roller and the handle portion is released, the bias of the roller causes the roller and the wrench to rotate back until the handle portion comes to rest against part of the tarpaulin assembly or part of the truck, thereby preventing further rotation of the roller and allowing an operator to replace the tarpaulin. The tarpaulin replacement method comprises the steps of unrolling the tarpaulin from the roller against the spring-biasing force of the roller until the attachment of the tarpaulin to the roller is exposed, securing the roller against rotation, detaching the tarpaulin from the roller, attaching a new tarpaulin to the roller, releasing the roller, and allowing the spring-biasing force of the roller to cause the roller to rotate, thereby rolling the new tarpaulin onto the roller.

4 Claims, 8 Drawing Sheets

ROLLER STOP FOR TARPAULIN REPLACEMENT

FIELD OF THE INVENTION

The present invention relates generally to the field of spring-biased tarpaulin assemblies for use in covering truck beds, and more particularly to a roller stop and method for replacing the tarpaulins of such assemblies.

BACKGROUND OF THE INVENTION

Figure 1:
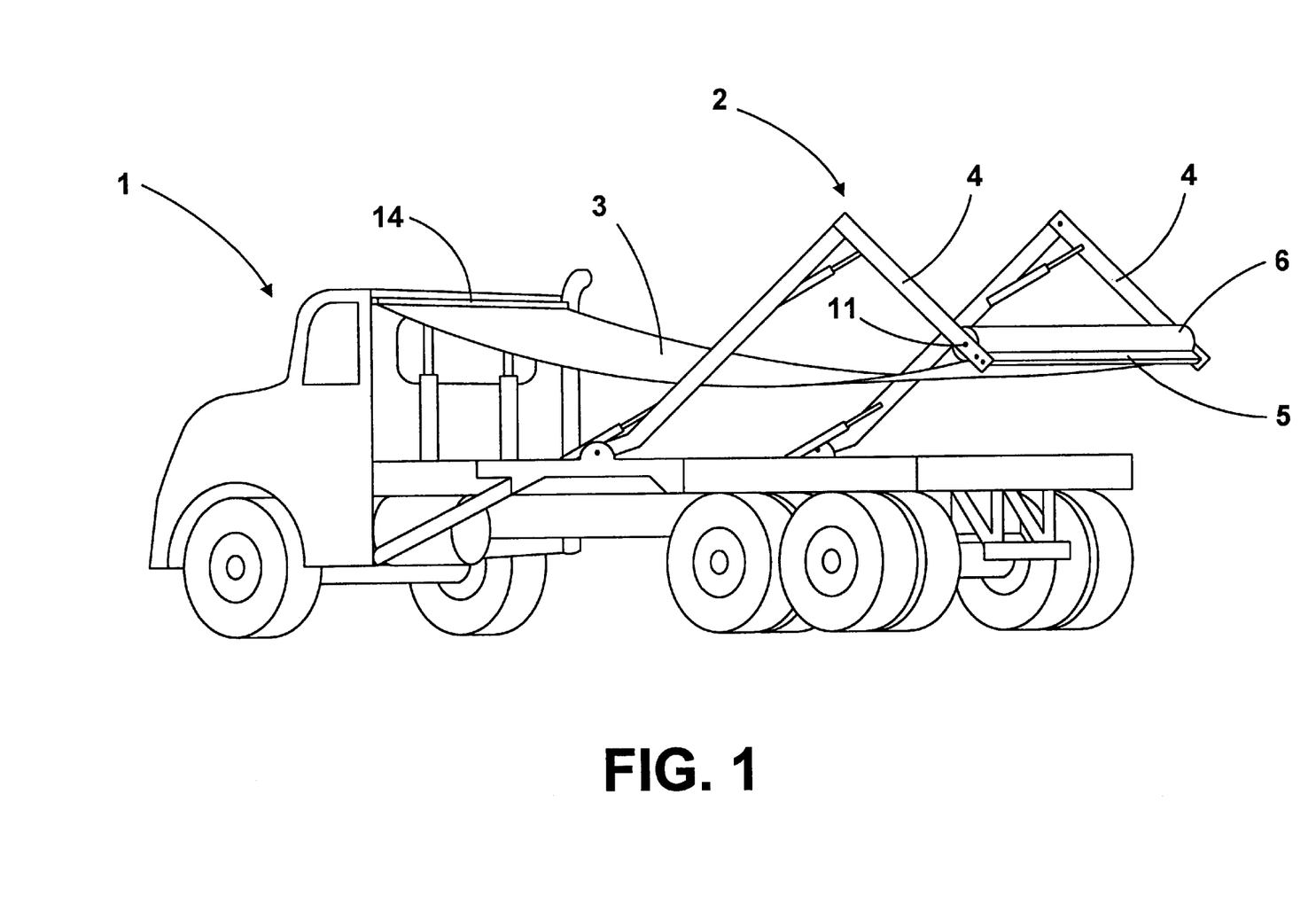
FIG. 1 is a perspective view of a truck having a spring-biased tarpaulin assembly in the extended position.
Figure 2:
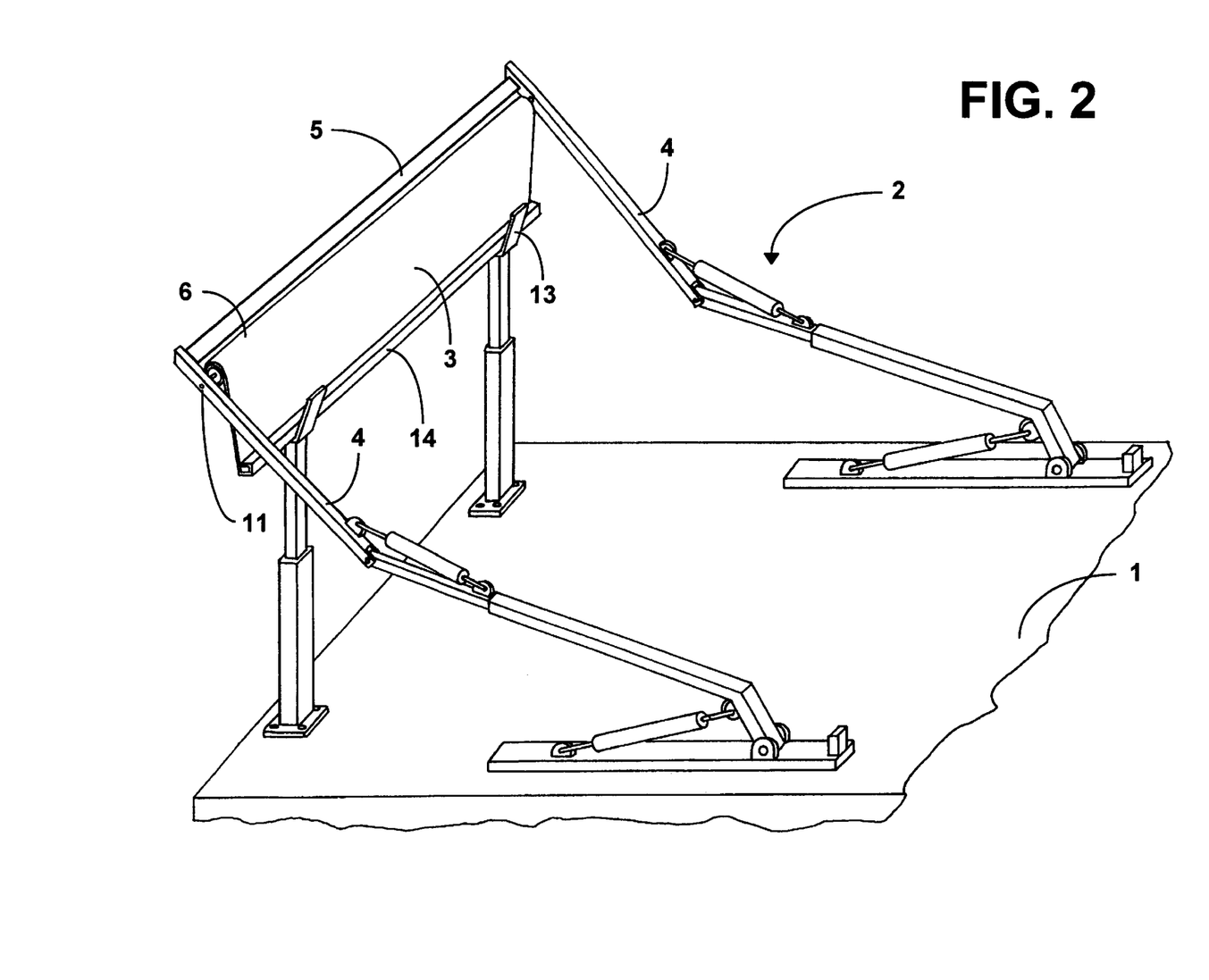
FIG. 2 is a close-up perspective view of the tarpaulin assembly in the retracted position.

Automatic tarpaulin assemblies are commonly used in the trucking industry to cover truck beds carrying items that might fall or be blown out of the truck bed were it not for the tarpaulin. Many of these automatic tarpaulin systems have a spring-biased roller onto which the tarpaulin is rolled. The inventor's prior U.S. Pat. No. 5,292,169, which is hereby incorporated by reference, discloses such an automatic tarpaulin system. FIGS. 1 and 2 also show such a tarpaulin assembly 2 mounted on a truck 1. For simplicity, the truck 1 in FIG. 1 is depicted without any side walls on the truck bed. In FIG. 2, all parts of the truck 1 other than the truck bed have been removed.

As shown in FIGS. 1 and 2, the tarpaulin assembly 2 has two jointed side arms 4 which can be extended and retracted by hydraulic cylinders provided on the assembly 2. Disposed between the side arms 4 towards their ends is a roller shaft 11 on which a tarpaulin roller 6 is rotatably mounted. The roller 6 is spring-biased on the roller shaft 11 in a counter-clockwise direction (from the vantage point of FIGS. 1 and 2). A tarpaulin 3 is secured to the roller 6 at one end and to the truck 1 at the other end. As best shown in FIG. 2, the end of the tarpaulin that is attached to the truck 1 is provided with a rigid member 14 running the width of the tarpaulin 3 which rests in and is secured to at least one tarpaulin cradle 13 mounted on the truck 1. In most systems, a cross member 5 is mounted between the side arms 4 adjacent and parallel to the roller shaft 11 to provide added stability to the assembly 2.

When it is desired to cover the bed of the truck 1 with the tarpaulin 3, the side arms 4 are extended away from the cab of the truck 1 to the position shown in FIG. 1. As the side arms 4 extend, the tarpaulin 3 is unrolled from the roller 6, overcoming the spring-biasing force of the roller 6. To uncover the truck bed, the side arms 4 are retracted to the position shown in FIG. 2. This allows the spring-biasing force of the roller 6 to roll the tarpaulin 3 back up onto the roller 6.

Figure 3:
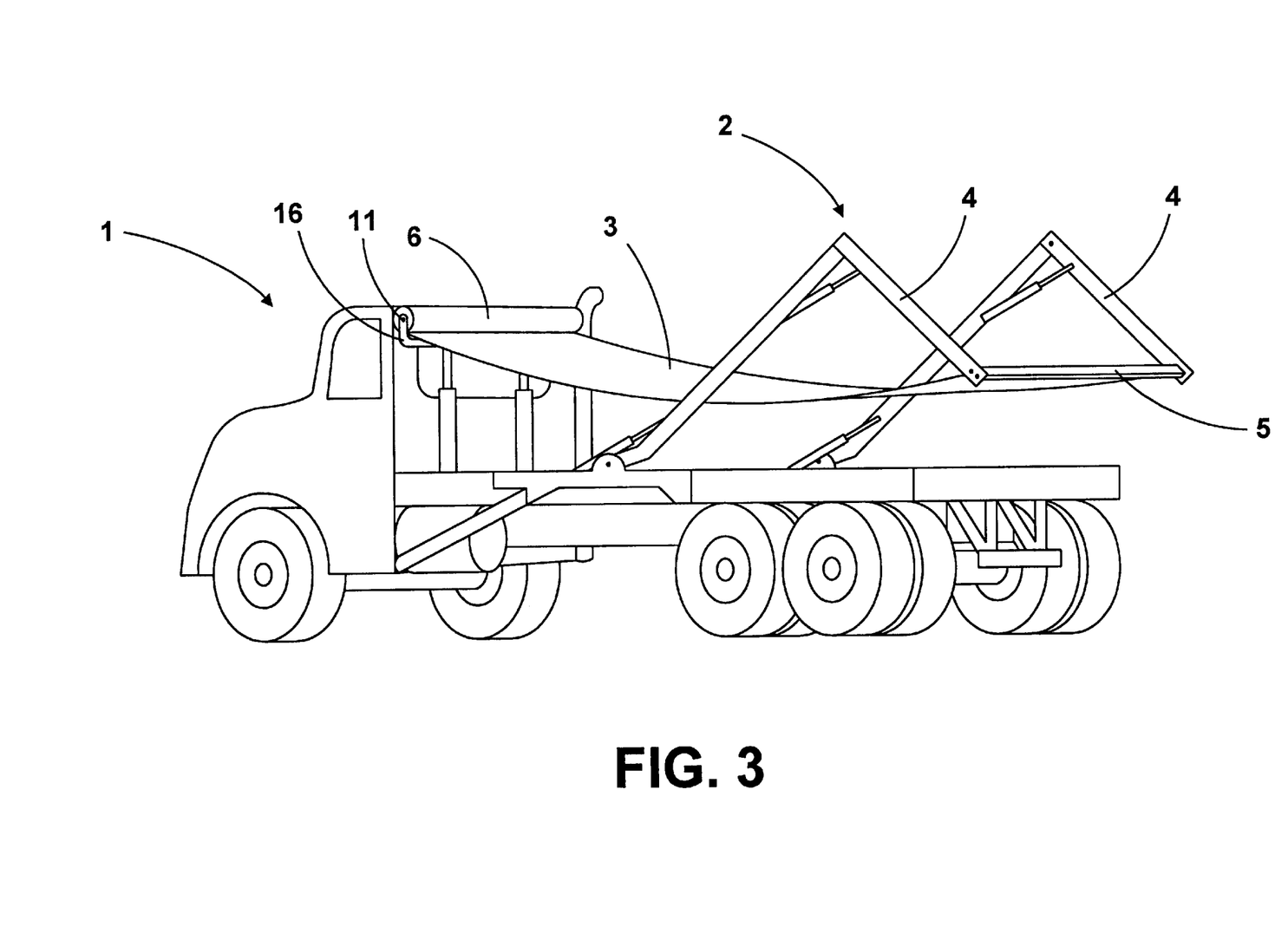
FIG. 3 is a perspective view of a truck having a spring-biased tarpaulin assembly wherein the roller is mounted in a fixed location near the cab of the truck.

In some automatic tarpaulin systems, such as the one shown in FIG. 3, the roller 6 is mounted on a stationary support 16 near the cab of the truck 1 rather than at the end of the side arms 4. The end of the tarpaulin 3 that is not attached to the roller 6 is attached to the cross member 5. Such a system usually includes an air foil (not shown) covering the roller 6 to reduce wind resistance. Other than the placement of the roller 6, the layout and operation of the system shown in FIG. 3 is the same as that of FIGS. 1 and 2.

Although tarpaulins 3 are usually made of canvas or some other sturdy material, they may become sufficiently worn after extensive use so as to require replacement. Replacement of worn-out tarpaulins 3 in spring-biased tarpaulin assemblies 2 of the type shown in FIGS. 1, 2, and 3 has traditionally been a very laborious and time consuming endeavor. This is because the spring-bias of the roller 6 makes it impossible to replace the tarpaulin 3 while the roller 6 is still attached to the assembly 2. Therefore, prior art tarpaulin replacement methods have always required the removal of the roller 6 from the assembly 2.

The following is a summary of the tarpaulin replacement procedure for an automatic tarpaulin assembly 2 of the type shown in FIGS. 1 and 2. Although there are some minor variations, the procedure for the system shown in FIG. 3 is roughly analogous.

The procedure begins by fully retracting the side arms 4 to the point shown in FIG. 2. Next, the end of the tarpaulin 3 having the rigid member 14 is detached from the tarpaulin cradle 13. The roller 6 and roller shaft 11 are then detached from the side arms 4, thus freeing the tarpaulin 3 and roller 6 from the rest of the assembly 2 and relieving the tension biasing the roller 6. Once free, the roller 6 must be carried to a large open area and placed on the ground to provide room for the rest of the replacement procedure. This is no small task as the roller 6 with the tarpaulin 3 completely rolled up on it can be quite heavy. Once the roller 6 is on the ground, the tarpaulin 3 must be completely unrolled from the roller until the attachment of the tarpaulin 3 to the roller 6 is exposed. This attachment, usually several screws, is then removed to free the tarpaulin 3 from the roller 6. stop to the roller preferably comprises an outwardly-projecting stem for engaging a hole provided in the side of the roller when the roller-shaft-engaging portion engages the roller shaft.

If the tarpaulin assembly has a cross member disposed adjacent and parallel to the roller shaft, the handle portion of the stop may rest against the cross member to prevent rotation of the roller. If the tarpaulin assembly does not have a cross member, but has side arms between which the roller shaft is mounted, the handle portion of the stop may be provided with an outwardly-extending side member which can rest against one of the side arms to prevent rotation of the roller.

The tarpaulin replacement method comprises the steps of unrolling the tarpaulin from the roller against the spring-biasing force of the roller until the attachment of the tarpaulin to the roller is exposed, securing the roller against rotation, detaching the tarpaulin from the roller, attaching a new tarpaulin to the roller, releasing the roller, and allowing the spring-biasing force of the roller to cause the roller to rotate, thereby rolling the new tarpaulin onto the roller. Preferably, the steps of detaching the tarpaulin from the roller and attaching a new tarpaulin to the roller are performed while the roller and the roller shaft are still attached to the tarpaulin assembly.

The step of securing the roller against rotation preferably comprises securing a roller stop to the roller, and allowing the spring-biasing force of the roller to cause the roller and the roller stop to rotate back until the roller stop comes to rest against part of the tarpaulin assembly or part of the truck, thereby preventing further rotation of the roller. The step of releasing the roller preferably comprises removing the roller stop from the roller. The method preferably also comprises the step of providing a hole in the side of the roller, the hole being adapted to engage a stem provided on the roller stop to secure the roller stop to the roller.

Because the apparatus and method of the present invention prevent the roller of the tarpaulin assembly from rotating under the spring-biasing force during a tarpaulin replacement procedure, the tarpaulin may be replaced without having to remove the roller and the roller shaft from the assembly. This saves considerable time and effort over the prior art replacement method.

Next, a new tarpaulin 3 is laid out over the old tarpaulin. This new tarpaulin 3 is then attached to the roller 6 and rolled up on it. The roller 6 (including the roller shaft 11) and the new tarpaulin 3 must then be carried back to the truck 1 and lifted up onto the tarpaulin cradle 13. The end of the tarpaulin 3 having the rigid member 14 is attached to the tarpaulin cradle 13 and the roller 6 and roller shaft 11 are reattached to one of the side arms 4. Next, the roller 6 is tensioned so that it will once again be spring-biased in the counter-clockwise direction. Finally, the roller 6 is reattached to the other side arm 4. The entire replacement process often requires three to four man-hours to complete.

Clearly, the process would be greatly simplified if the tarpaulin 3 could be replaced without having to remove the roller 6 from the assembly 2. This would avoid: (i) the difficulty associated with detaching the roller 6 and roller shaft 11 from the side arms 4, (ii) the work involved with lowering the roller 6 and carrying it away from the truck 1, (iii) the heavy lifting involved with carrying the roller 6 back to the truck 1 and lifting it into place, (iv) the difficulty associated with reattaching the roller 6 and roller shaft 11 to the side arms 4, and (v) the need to re-tension the roller 6 after the tarpaulin 3 is replaced so that it is once again spring-biased.

SUMMARY OF THE INVENTION

Therefore, it is an object of the present invention to provide an apparatus and method for replacing the tarpaulin of a spring-loaded tarpaulin assembly without having to remove the tarpaulin roller from the assembly.

The apparatus of the present invention is a roller stop for use during a tarpaulin replacement procedure performed on a truck with a tarpaulin assembly having a spring-biased tarpaulin roller rotatably mounted on a roller shaft and a tarpaulin attached to the roller. The roller stop comprises a handle portion, a roller-shaft-engaging portion, and means for securing the roller stop to the roller when the roller-shaft-engaging portion engages the roller shaft. When the stop is secured to the roller and the handle portion is released, the bias of the roller causes the roller and the stop to rotate back until the handle portion comes to rest against part of the tarpaulin assembly or part of the truck, thereby preventing further rotation of the roller and allowing an operator to replace the tarpaulin. The means for securing the roller.

BRIEF DESCRIPTION OF THE DRAWINGS

The present invention will be more fully understood by reference to the detailed description below when considered in conjunction with the following drawings wherein like reference numbers denote the same or similar items shown throughout the several Figures, in which.

DETAILED DESCRIPTION OF THE INVENTION

Figure 4:
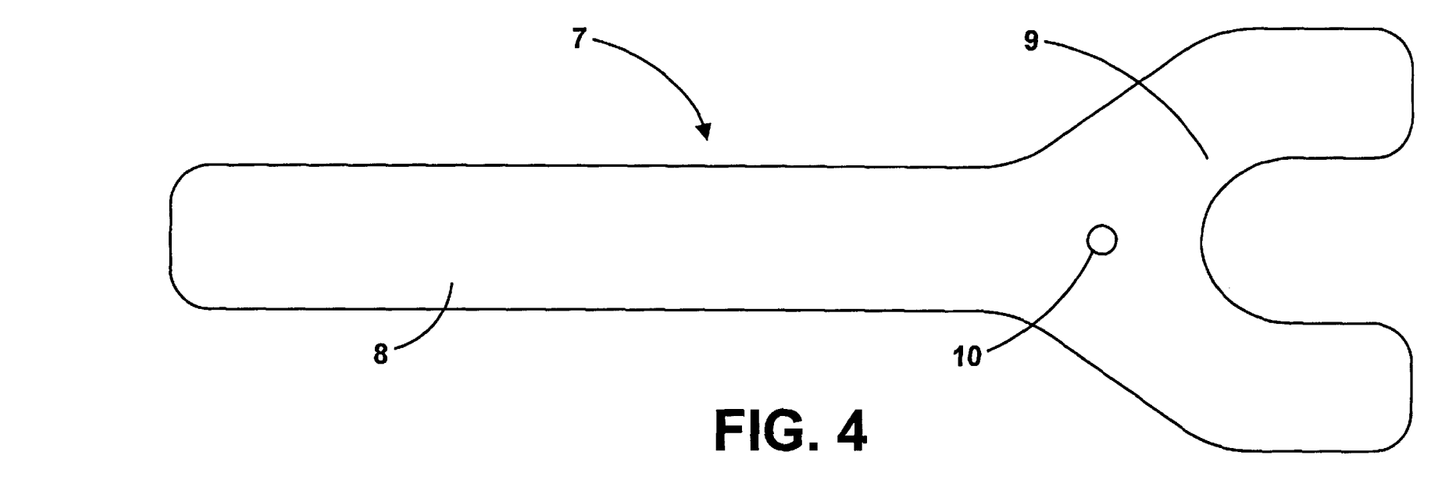
FIG. 4 is a top view of the roller stop of the present invention.
Figure 5:
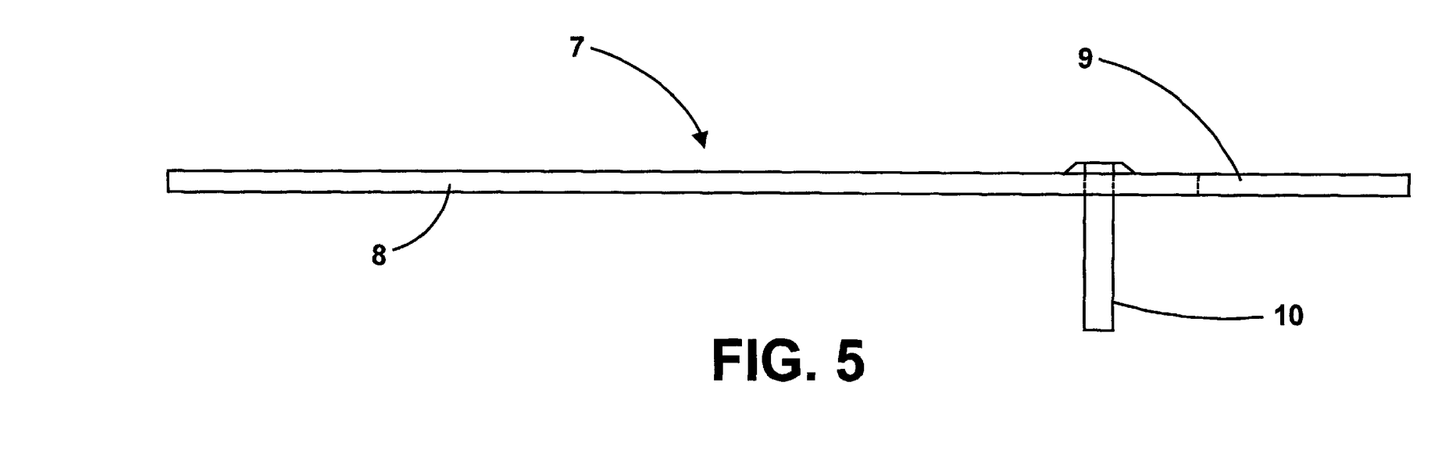
FIG. 5 is a side view of the roller stop of the present invention.

FIGS. 4 and 5 show the appearance of the roller stop 7 of the present invention. The stop 7 is preferably made out of steel, although other rigid materials may be used. The stop 7 is preferably about eleven inches long and about three sixteenths of an inch thick. However, other dimensions may be used without departing from the scope of the invention. The stop 7 comprises an elongated handle portion 8, a roller-shaft-engaging portion 9, and an outwardly protruding stem 10 located between the handle portion 8 and the roller-shaft-engaging portion 9. The roller-shaft-engaging portion 9 preferably comprises a forked member defining a slot for engaging the roller shaft 11 of the tarpaulin assembly 2. The stem 10 is preferably about one-quarter inch in diameter and is preferably located centrally along the width of the stop 7 about seven-eighths of an inch away from the edge of the slot of the roller-shaft-engaging portion 9. Again, however, other dimensions may be used. The stop is preferably formed by plasma cutting a flat sheet of steel, but other methods well known in the art of metal shaping may be employed.

Figure 6:
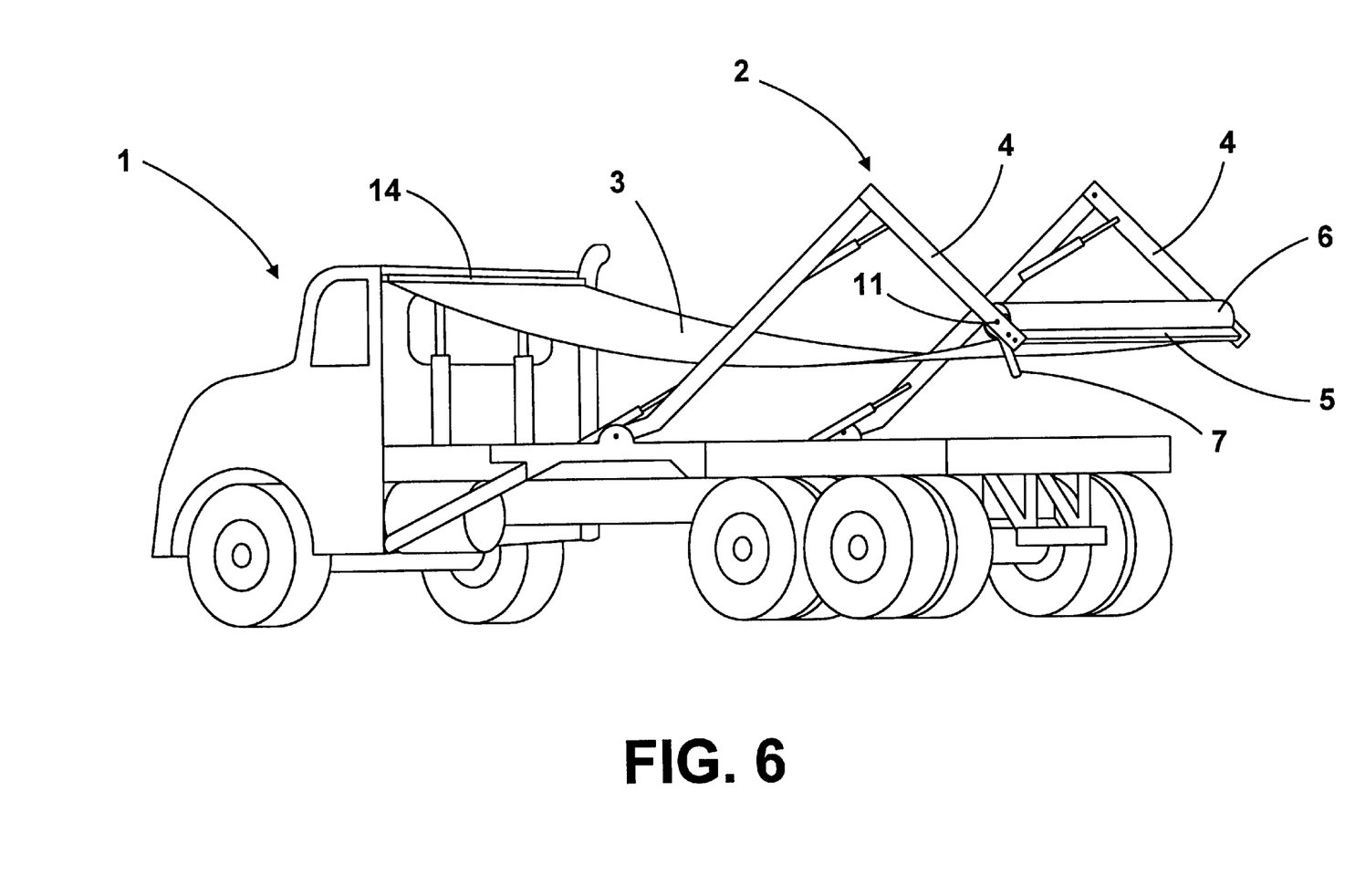
FIG. 6 is a perspective view of the truck of FIG. 1 with the roller stop of FIGS. 4 and 5 being used during a tarpaulin replacement procedure.
Figure 7:
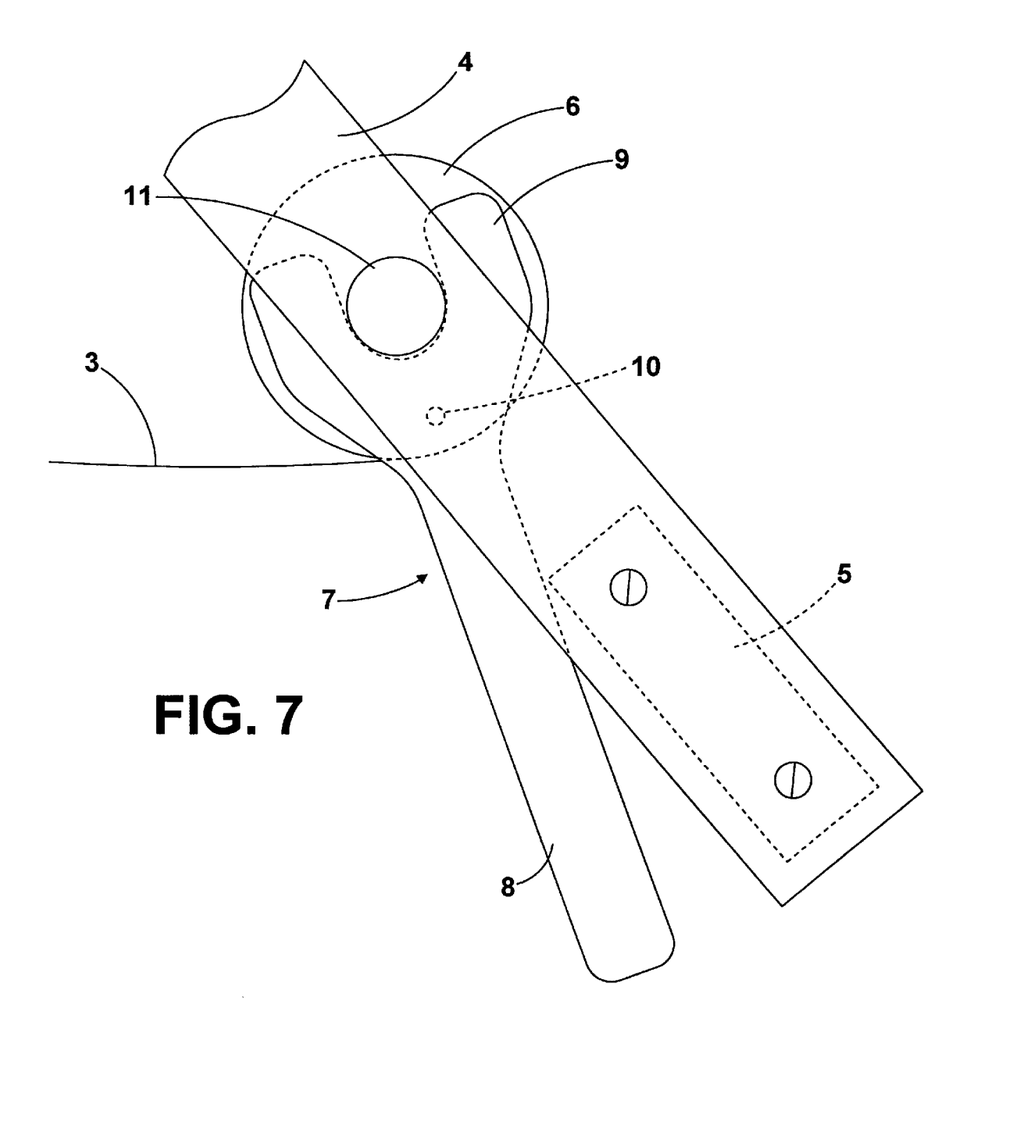
FIG. 7 is a side view of the tarpaulin assembly with the roller stop of FIGS. 4 and 5 secured to the roller and resting against the cross member of the assembly.
Figure 8:
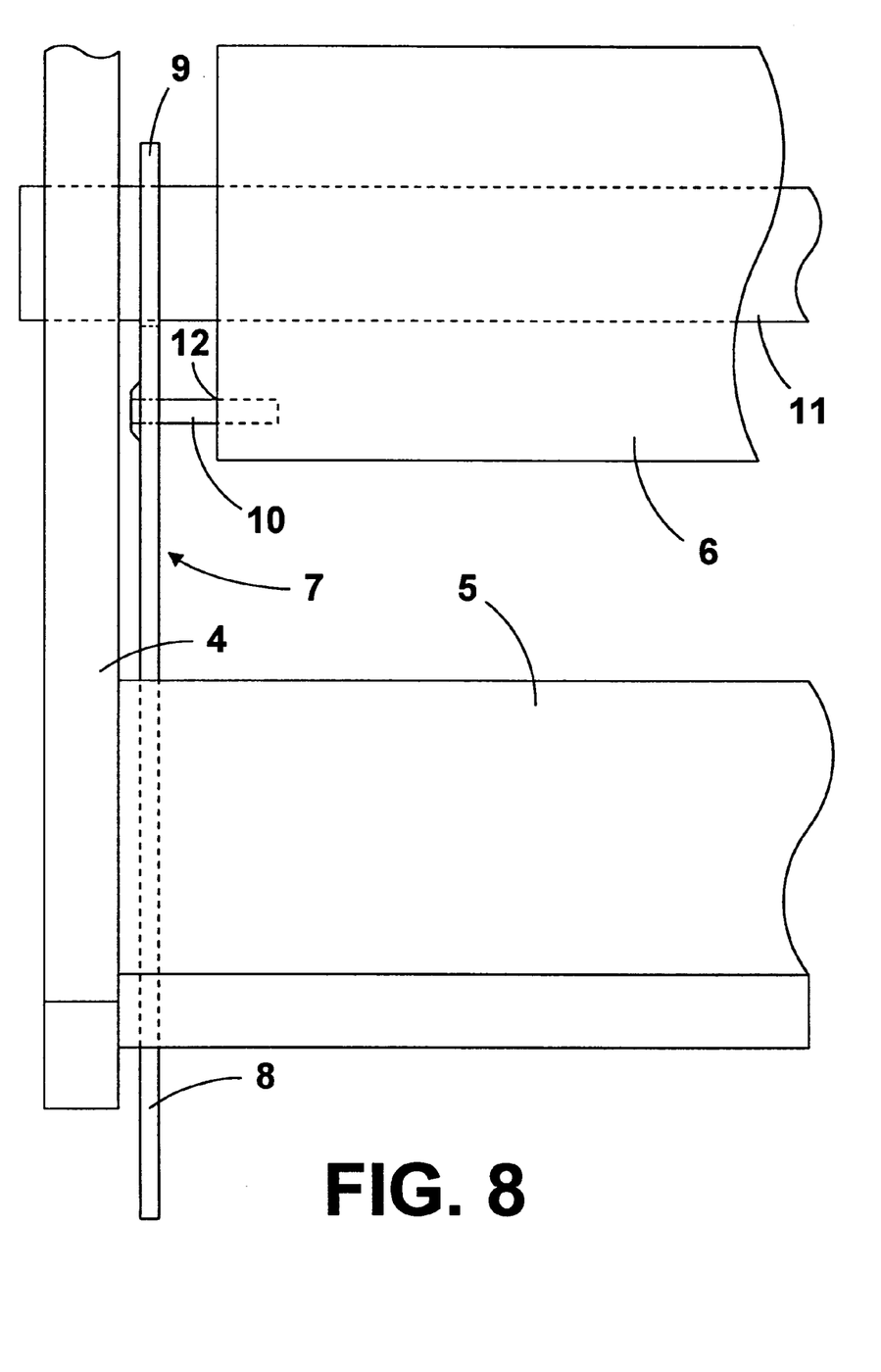
FIG. 8 is a rear view of one side of the tarpaulin assembly with the roller stop of FIGS. 4 and 5 secured to the roller and resting against the cross member of the assembly.

Using the stop 7 of the present invention, the replacement of a tarpaulin 3 can be accomplished in significantly less time and with much less effort. FIGS. 6–8 show the stop 7 in use. Before the stop 7 can be used with a particular tarpaulin assembly 2 for the first time a hole 12 (FIG. 8) having a diameter slightly larger than the diameter of the stem 10 of the stop 7 should be provided in the side of the roller 6. The hole 12 should be positioned so that when the roller-shaft-engaging portion 9 of the stop 7 engages the roller shaft 11, the stem 10 can be inserted into the hole 12.

Once the hole 12 the hole 12 in the side of the roller 6 has been made, the first step in the tarpaulin replacement process is to extend the side arms 4 of the tarpaulin assembly 2 to their fullest and lowest extent, thereby unrolling most of the tarpaulin 3 from the roller 6. Next, the remaining length of the tarpaulin 3 should be manually unrolled from the roller 6 against the spring-biasing tension until the connection (usually screws) of the tarpaulin 3 to the roller 6 is exposed. The stop 7 can then be positioned so that the slot of the roller-shaft-engaging portion 9 engages the roller shaft 11 between the side of the roller 6 and the side arm 4. The stem 10 of the stop 7 should then be inserted into the hole 12 in the side of the roller 6, thus securing the stop 7 to the roller 6 and causing it to rotate when the roller 6 rotates. The tarpaulin 3 may then be gently released to allow the bias of the roller 6 to cause the roller 6 and the stop 7 to rotate back until the handle portion 8 of the stop 7 comes to rest against the cross member 5, thereby preventing further rotation of the roller 6. This is the position shown in FIGS. 5–7.

Figure 9:
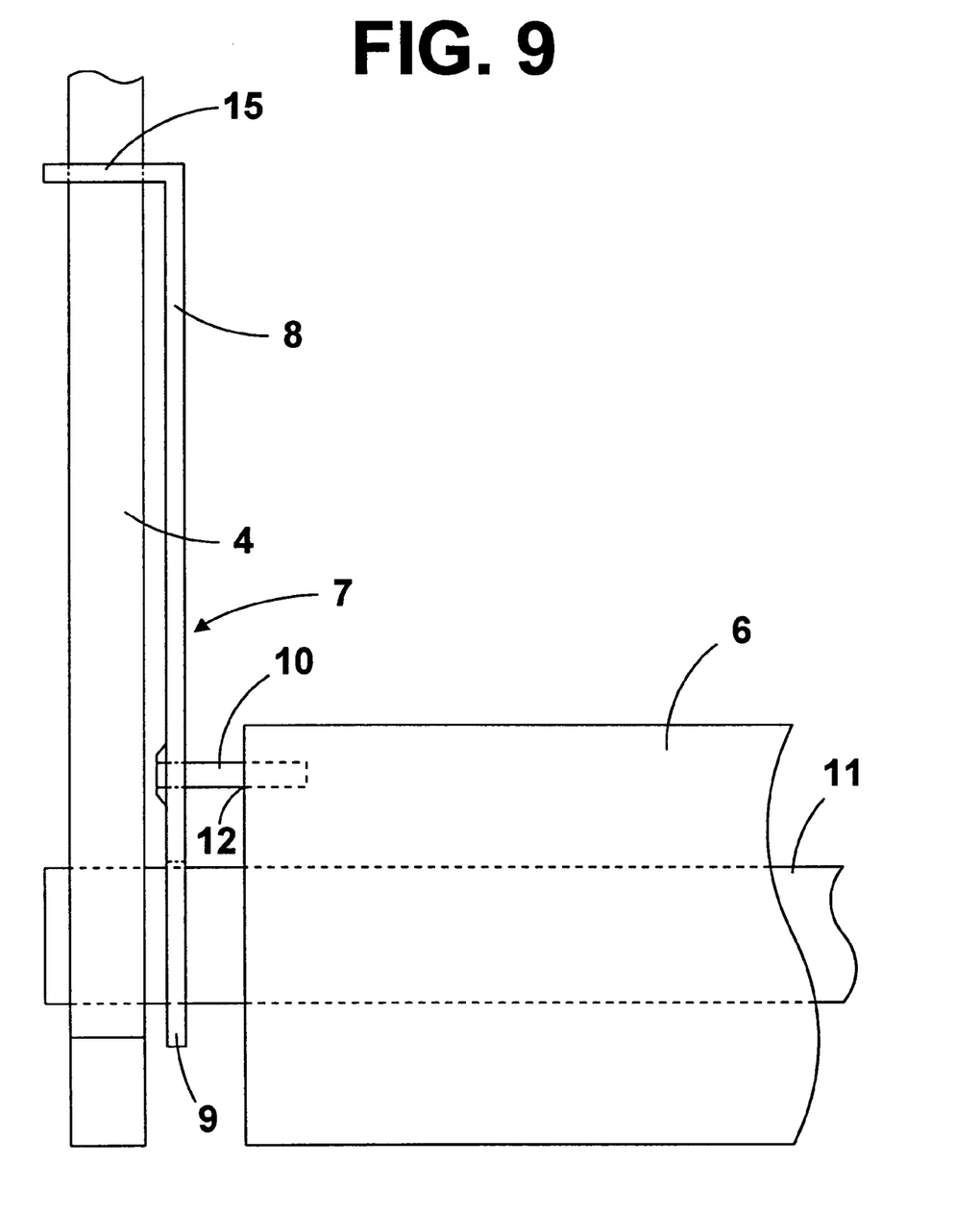
FIG. 9 is a rear view of one side of the tarpaulin assembly with another embodiment of roller stop secured to the roller and resting against one of the side arms of the assembly

If the assembly 2 does not have a cross member 5, the handle portion 8 of the stop 7 could alternatively be provided with an outwardly-extending side member 15 for engaging the side arm 4 of the assembly to prevent the rotation of the roller 6, as shown in FIG. 9. For systems of the type shown in FIG. 3, the handle portion 8 could rest against the air foil (not shown), the support 16 on which the roller shaft is mounted, or against the cab of the truck 1 itself (if the roller 6 is mounted sufficiently close to the cab).

With the roller 6 secured against rotation by the stop 7, the old tarpaulin 3 should then be detached from the roller 6 and the tarpaulin cradle 13 and disposed of. A new tarpaulin 3 may then be attached at its opposite ends to the roller 6 and the tarpaulin cradle 13 (or the cross member 5 for systems of the type shown in FIG. 3). Next, the new tarpaulin 3 should be pulled manually to cause the roller 6 to rotate against the spring-biasing force, thereby relieving the pressure holding the locking stop 7 against the cross member 5 (or other part of the assembly 2 or the truck 1 for systems of the type shown in FIGS. 3 and 9). The stop 7 can then be removed from the roller 6. Slowly, the tarpaulin 3 should be released and allowed to roll up on the roller 6 until all of the slack in the tarpaulin 3 has been taken up. Finally, the side arms 4 can be fully retracted to cause the tarpaulin 3 to be completely rolled up onto the roller 6.

Using the stop 7 of the present invention, the entire tarpaulin replacement procedure can be performed without having to remove the roller 6 and the roller shaft 11 from the tarpaulin assembly 2. This reduces the time needed for the procedure from three to four man-hours to only about one-half man-hour.

While the roller stop apparatus and tarpaulin replacement method described herein constitute the preferred embodiments of the present invention, it is to be understood that the invention is not limited to the precise form of apparatus or the precise steps of the method, respectively, and that changes may be made therein without departing from the scope of the invention which is defined in the appended claims.

What is claimed is:

1. The combination of a roller stop and a tarpaulin roller for use during a tarpaulin replacement procedure performed on a truck with a tarpaulin assembly having a tarpaulin attached to the roller where the roller is spring-biased and is rotatably mounted on a roller shaft, the combination comprising:

the roller stomp comprising:

a handle portion;

a roller-shaft-engaging portion; and
   a stem projecting outwardly from the roller stop between the handle portion and the roller-shaft-engaging portion and the tarpaulin roller comprising:
   a hole in the side of the roller, sized to accept the stem and positioned such that the stem is received within hole when the roller-shaft-engaging portion engages the roller shaft;

whereby when the roller stop is secured to the roller and the handle portion is released, the bias of the roller causes the roller and the stop to rotate back until the handle portion comes to rest against part of the tarpaulin assembly or part of the truck, thereby preventing fiber rotation of the roller and allowing an operator to replace the tarpaulin.

2. A combination as recited in claim 1, wherein:

a. said tarpaulin assembly has at least one cross member disposed adjacent and parallel to the roller shaft; and b. the part against which the handle portion comes to rest is the cross member.

3. A comination as recited in claim 1, wherein:

a. said tarpaulin assembly has at least two side arms between which the roller shaft is mounted; and b. the part against which the handle portion comes to rest is one of the side arms.

4. A combination as recited in claim 3, wherein:

a. said handle portion comprises an outwardly-extending side member; and b. it is the outwardly-extending side member which comes to rest against one of the side arms.

* * * * *

UNITED STATES PATENT AND TRADEMARK OFFICE
CERTIFICATE OF CORRECTION

PATENT NO. : 6,070,313  
DATED : June 6, 2000  
INVENTOR(S) : Woody V. O'Brian

It is certified that error appears in the above-identified patent and that said Letters Patent is hereby corrected as shown below:

Column 2,
Line 23, after "6" delete "stop to the roller preferably comprises an outwardly-projecting stem for engaging a hole provided in the side of the roller when the roller-shaft-engaging portion engages the roller shaft.

If the tarpaulin assembly has a cross member disposed adjacent and parallel to the roller shaft, the handle portion of the stop may rest against the cross member to prevent rotation of the roller. If the tarpaulin assembly does not have a cross member, but has side arms between which the roller shaft is mounted, the handle portion of the stop may be provided with an outwardly-extending side member which can rest against one of the side arms to prevent rotation of the roller.

The tarpaulin replacement method comprises the steps of unrolling the tarpaulin from the roller against the spring-biasing force of the roller until the attachment of the tarpaulin to the roller is exposed, securing the roller against rotation, detaching the tarpaulin from the roller, attaching a new tarpaulin to the roller, releasing the roller, and allowing the spring-biasing force of the roller to rotate, thereby rolling the new tarpaulin onto the roller. Preferably, the steps of detaching the tarpaulin from the roller and attaching a new tarpaulin to the roller are performed while the roller and the roller shaft are still attached to the tarpaulin assembly.

The step of securing the roller against rotation preferably comprises securing a roller stop to the roller, and allowing the spring-biasing force of the roller to cause the roller and the roller stop to rotate back until the roller stop comes to rest against part of the tarpaulin assembly or part of the truck, thereby preventing further rotation of the roller. The step of releasing the roller preferably comprises removing the roller stop from the roller. The method preferably also comprises the step of providing a hole in the side of the roller, the hole being adapted to engage a stem provided on the roller stop to secure the roller stop to the roller.

Because the apparatus and method of the present invention prevent the roller of the tarpaulin assembly from rotating under the spring-biasing force during a tarpauline replacement procedure, the tarpaulin may be replaced without having to remove the roller and the roller shaft from the assembly. This saves considerable time and effort over the prior art replacement method, " and insert at column 3, line 43 after "roller",

UNITED STATES PATENT AND TRADEMARK OFFICE
CERTIFICATE OF CORRECTION

PATENT NO. : 6,070,313
DATED : June 6, 2000
INVENTOR(S) : Woody V. O'Brian

It is certified that error appears in the above-identified patent and that said Letters Patent is hereby corrected as shown below:

<u>Column 6,</u>
Line 1, delete "stomp" and insert therefor -- stop --.
Line 10, after "within" insert -- the -- .
Line 26, delete "comination" and insert therefor -- combination --.

Signed and Sealed this

Seventh Day of August, 2001

*Attest:*

*Nicholas P. Godici*

*Attesting Officer*

NICHOLAS P. GODICI
*Acting Director of the United States Patent and Trademark Office*